(12) United States Patent
Jaeger et al.

(10) Patent No.: US 12,292,936 B2
(45) Date of Patent: May 6, 2025

(54) INTELLIGENT ASSET SUGGESTIONS BASED ON BOTH PREVIOUS PHRASE AND WHOLE ASSET PERFORMANCE

(71) Applicant: Google LLC, Mountain View, CA (US)

(72) Inventors: Timothy Edward Jaeger, Bloomfield, NJ (US); Caren Zeng, Brooklyn, NY (US); Maxwell Ryan Hagler, New York, NY (US); Sylvanus Garnet Bent, III, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/011,346

(22) PCT Filed: Aug. 30, 2022

(86) PCT No.: PCT/US2022/042009
§ 371 (c)(1),
(2) Date: Dec. 19, 2022

(87) PCT Pub. No.: WO2024/049415
PCT Pub. Date: Mar. 7, 2024

(65) Prior Publication Data
US 2024/0241913 A1   Jul. 18, 2024

(51) Int. Cl.
*G06F 16/95* (2019.01)
*G06Q 30/0241* (2023.01)

(52) U.S. Cl.
CPC ......... *G06F 16/95* (2019.01); *G06Q 30/0276* (2013.01)

(58) Field of Classification Search
CPC ............................ G06F 16/95; G06Q 30/0276
See application file for complete search history.

(56) References Cited

U.S. PATENT DOCUMENTS 9,996,523 B1 * 6/2018 Su .................... G06F 40/274
2005/0054381 A1   3/2005 Lee et al.
(Continued)

FOREIGN PATENT DOCUMENTS

| EP | 1522920 | 4/2005 | |
|---|---|---|---|
| WO | WO 2016/000212 | 1/2016 | |
| WO | WO-2016000212 A1 * | 1/2016 | ............. G06N 20/00 |

OTHER PUBLICATIONS

International Search Report and Written Opinion for Application No. PCT/US2022/042009, mailed Mar. 31, 2023, 14 pages.

*Primary Examiner* — Cao H Nguyen
(74) *Attorney, Agent, or Firm* — DORITY & MANNING P.A.

(57) ABSTRACT

Example embodiments of the present disclosure provide for an example method including obtaining data indicative of user input via a user interface associated with a construction workflow for generating customized content items. The example method includes determining one or more key terms associated with the user input. The example method includes determining one or more suggested content items based on the one or more key terms. The example method includes generating a predicted performance increase associated with each respective content item of the one or more suggested content items. The example method includes providing, to a first user device, data indicative of a structured input interface associated with the construction workflow configured with one or more input fields and the one or more suggested content items, wherein the structured input interface is configured for rendering via a graphical user interface.

19 Claims, 7 Drawing Sheets

(56) References Cited

U.S. PATENT DOCUMENTS

2018/0285748 A1* 10/2018 Husain .................. G06N 20/00
2024/0126576 A1* 4/2024 Bent, III ................ G06F 9/453

* cited by examiner

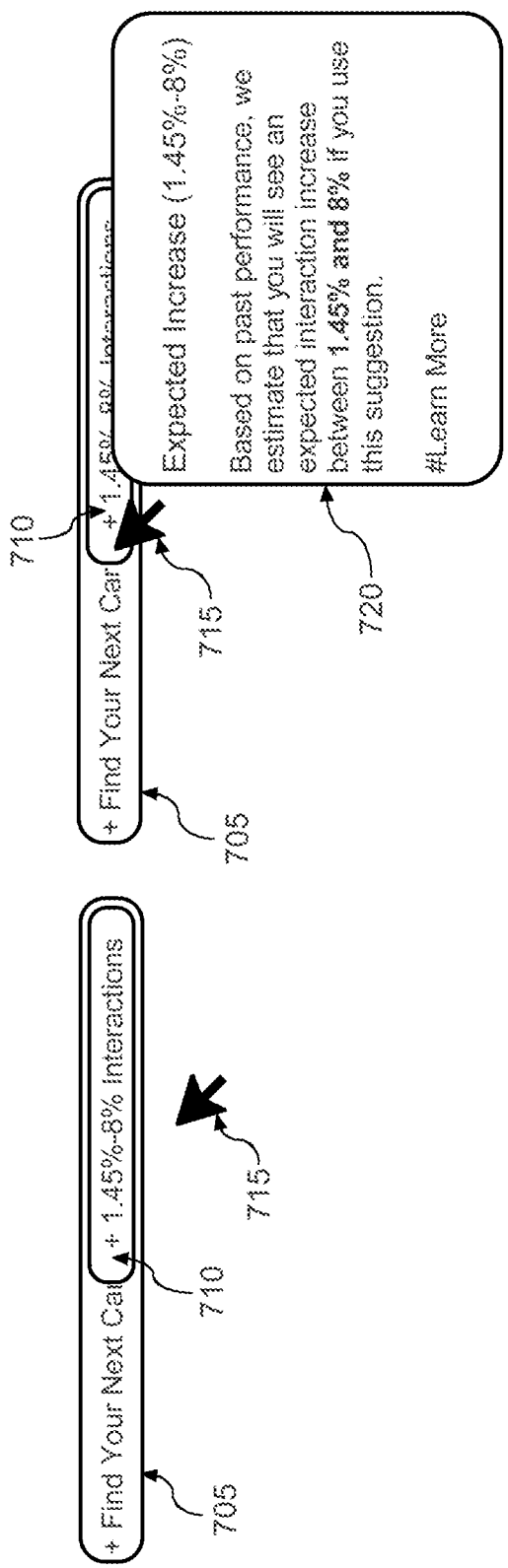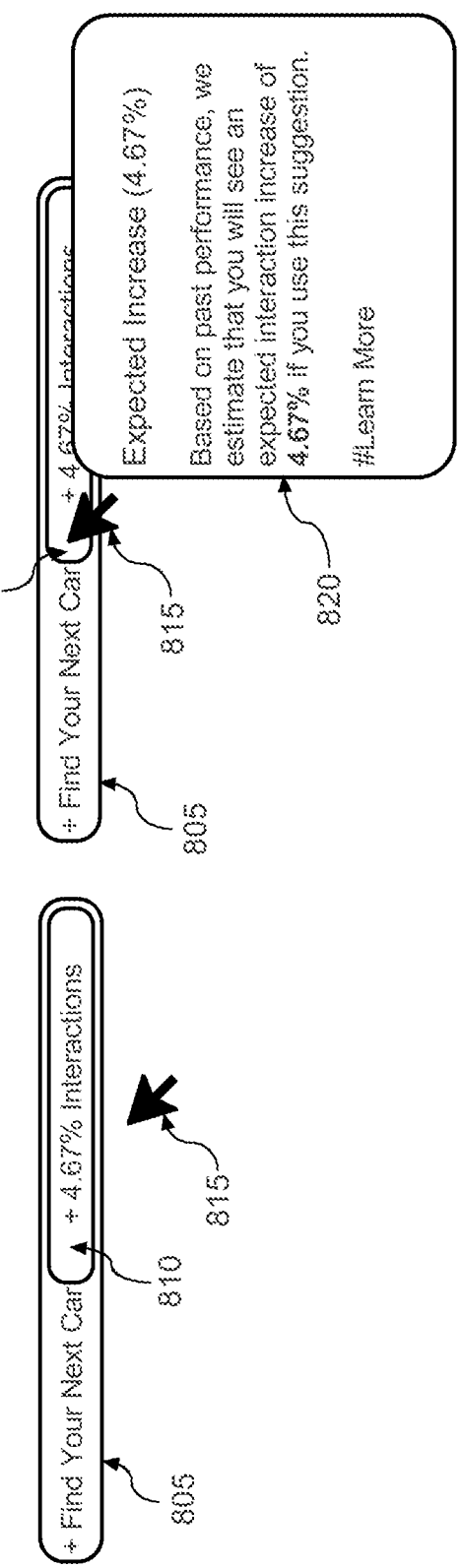
FIG. 7A  FIG. 7B  FIG. 8A  FIG. 8B

INTELLIGENT ASSET SUGGESTIONS BASED ON BOTH PREVIOUS PHRASE AND WHOLE ASSET PERFORMANCE

PRIORITY CLAIM

This application is based upon and claims the right of priority under 35 U.S.C. § 371 to International Application No. PCT/US2022/042009 filed on Aug. 30, 2022, Applicant claims priority to and the benefit of such application and incorporates all of such application herein by reference in its entirety.

FIELD

The present disclosure relates generally to systems and methods for intelligent asset suggestion based on previous phrases and whole asset performance. More particularly, the present disclosure relates to generating predicted performance increases associated with suggested content items and providing an updated user interface including the suggested content items and the respective predicted performance increase.

BACKGROUND

Computing devices can perform many tasks and provide interactive interfaces for content generation. Interactive interfaces for content generation can include a plurality of interactive components including input fields.

SUMMARY

Aspects and advantages of embodiments of the present disclosure will be set forth in part in the following description, or may be learned from the description, or may be learned through practice of the embodiments.

In one example aspect, the present disclosure provides for an example system for providing an adaptive user interface, including one or more processors and one or more memory devices storing instructions that are executable to cause the one or more processors to perform operations. In some implementations the one or more memory devices can include one or more transitory or non-transitory computer-readable media storing instructions that are executable to cause the one or more processors to perform operations. In the example system, the operations include obtaining data indicative of user input via a user interface associated with a construction workflow. In the example system, the operations include determining one or more key terms associated with the user input. In the example system, the operations include determining one or more suggested content items based on the one or more key terms. In the example system, the operations include generating a predicted performance increase associated with each respective content item of the one or more suggested content items. In the example system, the operations include providing, to a first user device, data indicative of a structured input interface associated with the construction workflow configured with one or more input fields and the one or more suggested content items, wherein the structured input interface is configured for rendering via a graphical user interface.

In some embodiments of the example system, the user input comprises a uniform resource locator (URL).

In some embodiments of the example system, determining one or more key terms associated with the user input comprises at least one of (i) analyzing the uniform resource locator (URL) for key terms or (ii) analyzing a website associated with the uniform resource locator (URL) for key terms.

In some embodiments of the example system, generating the predicted performance increase associated with each respective suggested content item of the one or more suggested content item comprises generating a predicted performance increase for at least one of (i) an individual word of the respective suggested content item or (ii) a phrase of the respective suggested content item.

In some embodiments of the example system, the operations include obtaining data indicative of a user indicating interest in a content item. In some embodiments of the example system, the operations include in response to obtaining the data indicative of the user indicating interest in a first content item of the suggested content items, generating a predicted performance for the first content item.

In some embodiments of the example system, the predicted performance increase is displayed as at least one of (i) an average predicted performance increase, (ii) a range of predicted performance increase, or (iii) a statistical significance of a predicted performance increase.

In some embodiments of the example system, the predicted performance increase is a percentage.

In some embodiments of the example system, the predicted performance increase is generated using a model.

In some embodiments of the example system, past performance of a content item is input in the model and used to generate the predicted performance increase of each respective content item of the one or more suggested content item.

In some embodiments of the example system, the operations include obtaining data indicative of past performance of one or more content items with one or more respective features. In some embodiments of the example system, the operations include comparing one or more features of a first suggested content item to one or more features of a prior used content item. In some embodiments of the example system, the operations include determining, based on the comparison of the one or more features of the first suggested content item and the prior used content item and the past performance of the one or more content items, a predicted performance for the first suggested content item.

In some embodiments of the example system, the model is a machine-learned model.

In some embodiments of the example system, the model is trained using actual performance data.

In some embodiments of the example system, the operations include obtaining data indicative of a user selection of a first suggested content item of the one or more suggested content items. In some embodiments of the example system, the operations include determining a predicted performance of a constructed content item based at least in part of the predicted performance of the first suggested content item.

In some embodiments of the example system, providing data indicative of the structured input interface associated with the construction workflow configured with one or more input fields and the one or more suggested content item includes ranking the one or more suggested content items based at least in part on predicted performance.

In some embodiments of the example system, ranking the one or more suggested content items includes determining a threshold performance increase value. In some embodiments of the example system, ranking the one or more suggested content items includes comparing each respective predicted performance increase to the threshold performance increase value. In some embodiments of the example system, ranking the one or more suggested content items includes determining that a first predicted performance increase associated with a first suggested content item is above the threshold performance increase value. In some embodiments of the example system, ranking the one or more suggested content items includes determining that a second predicted performance increase associated with a second suggested content item is above the threshold performance increase value and below the first predicted performance increase. In some embodiments of the example system, ranking the one or more suggested content items includes providing for display the first suggested content item and the second suggested content item, wherein the first suggested content item is displayed in a more prominent position than the second suggested content item.

In some embodiments of the example system, the operations include generating a first predicted performance increase associated with a first suggested content item. In some embodiments of the example system, the operations include comparing the first predicted performance increase with a threshold performance increase value. In some embodiments of the example system, the operations include determining that the first predicted performance increase is below the threshold performance increase value. In some embodiments of the example system, the operations include in response to determining that the first predicted performance increase is below the threshold performance increase value, preventing display of the first suggested content item.

In some embodiments of the example system, a first suggested content item of the one or more suggested content items comprises at least one of (i) a word, (ii) a phrase, (iii) an image, (iv) a video, or (v) an audio content item.

In one example aspect, the present disclosure provides for an example system for providing an adaptive user interface, including one or more processors and one or more memory devices storing instructions that are executable to cause the one or more processors to perform operations. In some implementations the one or more memory devices can include one or more transitory or non-transitory computer-readable media storing instructions that are executable to cause the one or more processors to perform operations. In the example system, the operations include obtaining data indicative of user input via a user interface associated with a construction workflow. In the example system, the operations include determining one or more key terms associated with the user input. In the example system, the operations include determining one or more suggested content items based on the one or more key terms. In the example system, the operations include generating a predicted performance increase associated with each respective content item of the one or more suggested content items. In the example system, the operations include generating, automatically, a first constructed content item comprising at least a first suggested content item of the one or more suggested content items based at least in part on comparing a first predicted performance increase associated with the first suggested content item to a threshold predicted performance increase value, wherein the threshold predicted performance increase value is determined based on user input data and determining the first predicted performance increase is above the threshold predicted performance increase value: augmenting a database of constructed content items to include the first constructed content item. In the example system, the operations include performing a matching process to provide the first constructed content item for display on a second user device based at least in part on a predicted probability of user interaction with the first constructed content item.

In an example aspect, the present disclosure provides for an example computer-implemented method. The example method includes obtaining data indicative of user input via a user interface associated with a construction workflow. The example method includes determining one or more key terms associated with the user input. The example method includes determining one or more suggested content items based on the one or more key terms. The example method includes generating a predicted performance increase associated with each respective content item of the one or more suggested content items. The example method includes providing, to a first user device, data indicative of a structured input interface associated with the construction workflow configured with one or more input fields and the one or more suggested content items, wherein the structured input interface is configured for rendering via a graphical user interface.

In some embodiments of the example method, the user input comprises a uniform resource locator (URL).

In some embodiments of the example method, determining one or more key terms associated with the user input comprises at least one of (i) analyzing the uniform resource locator (URL) for key terms or (ii) analyzing a website associated with the uniform resource locator (URL) for key terms.

In some embodiments of the example method, generating the predicted performance increase associated with each respective suggested content item of the one or more suggested content item includes generating a predicted performance increase for at least one of (i) an individual word of the respective suggested content item or (ii) a phrase of the respective suggested content item.

In some embodiments of the example method, the method includes obtaining data indicative of a user indicating interest in a content item. In some embodiments of the example method, the method includes in response to obtaining the data indicative of the user indicating interest in a first content item of the suggested content items, generating a predicted performance for the first content item.

In some embodiments of the example method, the predicted performance increase is displayed as at least one of (i) an average predicted performance increase, (ii) a range of predicted performance increase, or (iii) a statistical significance of a predicted performance increase.

In some embodiments of the example method, the predicted performance increase is a percentage.

In some embodiments of the example method, the predicted performance increase is generated using a model.

In some embodiments of the example method, past performance of a content item is input in the model and used to generate the predicted performance increase of each respective content item of the one or more suggested content item.

In some embodiments of the example method, the method includes obtaining data indicative of past performance of one or more content items with one or more respective features. In some embodiments of the example method, the method includes comparing one or more features of a first suggested content item to one or more features of a prior used content item. In some embodiments of the example method, the method includes determining, based on the comparison of the one or more features of the first suggested content item and the prior used content item and the past performance of the one or more content items, a predicted performance for the first suggested content item.

In some embodiments of the example method, the model is a machine-learned model.

In some embodiments of the example method, the model is trained using actual performance data.

In some embodiments of the example method, the method includes obtaining data indicative of a user selection of a first suggested content item of the one or more suggested content items. In some embodiments of the example method, the method includes determining a predicted performance of a constructed content item based at least in part of the predicted performance of the first suggested content item.

In some embodiments of the example method, providing data indicative of the structured input interface associated with the construction workflow configured with one or more input fields and the one or more suggested content item includes ranking the one or more suggested content items based at least in part on predicted performance.

In some embodiments of the example method, ranking the one or more suggested content items includes determining a threshold performance increase value. In some embodiments of the example method, the method includes comparing each respective predicted performance increase to the threshold performance increase value. In some embodiments of the example method, the method includes determining that a first predicted performance increase associated with a first suggested content item is above the threshold performance increase value. In some embodiments of the example method, the method includes determining that a second predicted performance increase associated with a second suggested content item is above the threshold performance increase value and below the first predicted performance increase. In some embodiments of the example method, the method includes providing for display the first suggested content item and the second suggested content item, wherein the first suggested content item is displayed in a more prominent position than the second suggested content item.

In some embodiments of the example method, the method includes generating a first predicted performance increase associated with a first suggested content item. In some embodiments of the example method, the method includes comparing the first predicted performance increase with a threshold performance increase value. In some embodiments of the example method, the method includes determining that the first predicted performance increase is below the threshold performance increase value. In some embodiments of the example method, the method includes in response to determining that the first predicted performance increase is below the threshold performance increase value, preventing display of the first suggested content item.

In some embodiments of the example method, a first suggested content item of the one or more suggested content items comprises at least one of (i) a word, (ii) a phrase, (iii) an image, (iv) a video, or (v) an audio content item.

In an example aspect, the present disclosure provides for an example computer-implemented method. The example method includes obtaining data indicative of user input via a user interface associated with a construction workflow. The example method includes determining one or more key terms associated with the user input. The example method includes determining one or more suggested content items based on the one or more key terms. The example method includes generating a predicted performance increase associated with each respective content item of the one or more suggested content items. The example method includes generating, automatically, a first constructed content item comprising at least a first suggested content item of the one or more suggested content items based at least in part on comparing a first predicted performance increase associated with the first suggested content item to a threshold predicted performance increase value, wherein the threshold predicted performance increase value is determined based on user input data and determining the first predicted performance increase is above the threshold predicted performance increase value; augmenting a database of constructed content items to include the first constructed content item. The example method includes performing a matching process to provide the first constructed content item for display on a second user device based at least in part on a predicted probability of user interaction with the first constructed content item.

In an example aspect, the present disclosure provides for an example transitory or non-transitory computer readable medium embodied in a computer-readable storage device and storing instructions that, when executed by a processor, cause the processor to perform operations. In the example transitory or non-transitory computer readable medium, the operations include obtaining data indicative of user input via a user interface associated with a construction workflow. In the example transitory or non-transitory computer readable medium, the operations include determining one or more key terms associated with the user input. In the example transitory or non-transitory computer readable medium, the operations include determining one or more suggested content items based on the one or more key terms. In the example transitory or non-transitory computer readable medium, the operations include generating a predicted performance increase associated with each respective content item of the one or more suggested content items. In the example transitory or non-transitory computer readable medium, the operations include providing, to a first user device, data indicative of a structured input interface associated with the construction workflow configured with one or more input fields and the one or more suggested content items, wherein the structured input interface is configured for rendering via a graphical user interface.

BRIEF DESCRIPTION OF THE DRAWINGS

Detailed discussion of embodiments directed to one of ordinary skill in the art is set forth in the specification, which makes reference to the appended figures, in which:

FIGS. 7A-7B depict example user interfaces according to example embodiments of the present disclosure.

FIGS. 8A-8B depict example user interfaces according to example embodiments of the present disclosure.

DETAILED DESCRIPTION

Overview

Figure 1:
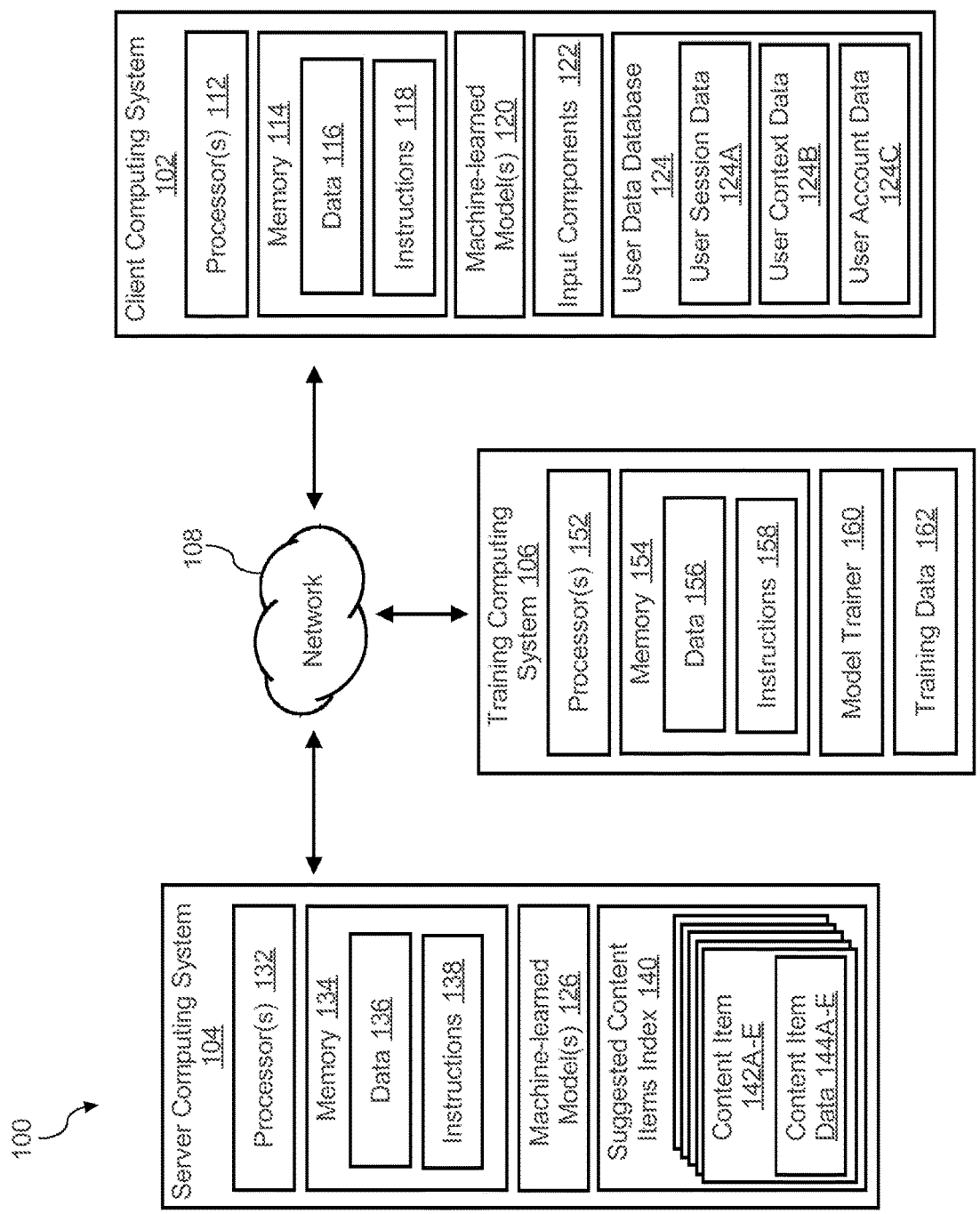
FIG. 1 depicts a block diagram of an example system for intelligent asset suggestions based on previous phrase and whole asset performance according to example embodiments of the present disclosure.

Generally, the present disclosure is directed to systems and methods for generating predicted performance increases associated with suggested content items (e.g., headlines, descriptions, images, videos) and providing an updated user interface including the suggested content items and the respective predicted performance increase. In some examples, the content items can be displayed via a structured input interface associated with a construction workflow (e.g., for creating a content item, a user account associated with one or more content items). Performance of suggested content items can include increased user interaction (e.g., clickthrough rate, conversion rate). Predicted performance of suggested content items can also be used to automatically generate customized content items (e.g., search result for display that link to a publisher website, generated constructed content items 267, constructed content item) constructed using one or more suggested content items (e.g., headlines, descriptions, titles).

Generally, systems can display insights for prior performance of content items (e.g., clickthrough rates, conversion rates), but they do not provide predictions for expected performance based on use of a content item within a construction workflow itself. The present disclosure relates to determining predicted performance of suggested content items (e.g., headlines, descriptions, images, videos) and the use of the predicted performances of suggested items to make intelligent suggestions to content creators.

In some implementations a construction workflow can be associated with a third party that provides a platform for content creators to generate customized content items (e.g., search results for display that link to a website, an advertisement, generated constructed content items 267). The third party can be associated with one or more publishers that can provide the customized content items (e.g., generated constructed content items 267) to third parties (e.g., consumers) and measure user interactions with the items (e.g., indicative of performance). For example, in some embodiments, an example system can obtain data indicative of user input via a user interface associated with a construction workflow. In some examples, a user can initiate a session with the third-party platform (e.g., a content creation platform) by providing login credentials. The creation platform can be used to generate content items to be published on third party websites. The creation platform can provide for display a construction workflow comprising one or more structured input interfaces with various fields. The system can obtain data indicative of user input into one or more input fields of the construction workflow.

In some implementations, the user input can include a uniform resource locator (URL) associated with a website associated with the user. The system can extract data from the URL itself and/or from the website associated with the user to generate key terms associated with the URL and/or website. For example, the URL can be westsidepuppies.com. The system can determine the key terms "westside" (e.g., associated with a location) and "puppies" (e.g., associated with puppies). The system can generate suggested headlines, descriptions, etc. (e.g., suggested content items) to provide via the structured user interface.

For each suggested content item, the system can generate a predicted performance increase indicative of the increase in performance of a customized content item (e.g., a content item constructed by the content creator) based on the use of the suggested content item (e.g., headline, description, image, video). For example, the system can determine a prediction that use of a headline "Puppies for Sale" may result in a 2% increase in performance (e.g., click through rate, user conversion rate) and a headline "Golden Retriever Puppies" may result in a 2.5% increase in performance. The system can provide to the user, via the structured user interface, information relating to the predicted increased performance associated with the headline options (e.g., the predicted performance increase presented alongside the suggested content item).

In some embodiments, a user can provide input associated with user account preferences indicative of a selection to automate the generation of constructed content items. In response to obtaining data indicative of the user account preference, the system can automatically generate customized content items (e.g., constructed content items, generated constructed content items 267) that maximize a predicted performance increase (e.g., use a headline with a highest predicted performance increase and a description with a highest predicted performance increase). Thus, the system can automatically generate a customized content item for a content creator based on minimal user input from the user (e.g., obtaining data indicative of a URL associated with a user website).

The system can generate predicted performance increase in any reasonable manner. For example, the system can predict performance increase based on past performance of content items with similar features to the suggested content items. For example, the system can access a database containing past performance data associated with individual words and/or groupings of words associated with previously constructed content items. The system can compare features of these previously constructed content items with features of the suggested content items and generate a predicted performance increase for the suggested content items.

In some implementations, the system can determine a predicted performance increase using one or more machine-learned models. For example, the system can use a feedback loop to obtain data indicative of actual performance of a suggested content item. The system can train the machine-learned model by comparing the predicted performance increase for a suggested content item to an actual performance of a suggested content item. By way of example, the system can train the machine-learned using a feedback loop which rewards the machine-learned model when the predicted performance increase is close to or equal to the actual performance of a suggested content item.

In some embodiments, the system can generate predicted performance increases for each suggested content item of a group of suggested content items. For example, if a suggested content item is a headline comprising multiple words, the system can determine a predicted performance model for each individual word of the multiple word phrase. Additionally, or alternatively, the system can determine a predicted performance increase for an entire content item (e.g., a multiple word phrase as a whole).

In some implementations, the system can generate predicted performance increase for a suggested content item in response to obtaining user input indicative of interest in a suggested content item (e.g., hovering over a headline).

The technology of the present disclosure can provide a number of technical effects and benefits. For instance, aspects of the described technology can allow for more efficient allocation of computing resources by reconfiguring a structured input interface to increase optimization of available screen space. For example, in some embodiments, constructed content items can be automatically generated using machine-learned models to optimize predicted performance increase for a constructed content item based on predicted performance increase for individual suggested content items. This can help reduce user errors and help reduce the computational processing and bandwidth usage by decreasing transmission of error notifications, transmission of incomplete input data structures, and futile processing of incomplete inputs. Example embodiments can also lead to additional computing efficiencies by automatically providing input elements for triggering automated process flows in subsequent processing steps. Providing improved access to such automated process flows using inputs on the user interface can result in a more efficient utilization of processing resources. Example embodiments can also reduce unnecessary processing by pre-filtering suggested content items, and only calculating predicted performance increase for suggested content items if the system has obtained information indicative of express user interest in selecting a particular content item. Thus, the system can reduce generation of predicted performance increase for items that will never be surfaced to the user due to lack of interest.

With reference now to the Figures, example embodiments of the present disclosure will be discussed in further detail.

Example Devices and Systems

FIG. 1 depicts a block diagram of an example computing system 100 that generates predicted performance increases associated with suggested content items and provides an updated user interface including the suggested content items and the respective predicted performance increase according to example embodiments of the present disclosure. The system 100 includes a client computing system 102, a server computing system 104, and a training computing system 106 that are communicatively coupled over a network 108.

The client computing system 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The client computing system 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more computer-readable storage media which may be non-transitory, such as RAM, ROM, EEPROM, EPROM, flash memory devices, magnetic disks, etc., and combinations thereof. The memory 114 can store data 116 and instructions 118 which are executed by the processor 112 to cause the client computing system 102 to perform operations.

In some implementations, the client computing system 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIG. 2.

In some implementations, the one or more machine-learned models 120 can be received from the server computing system 104 over network 108, stored in the user computing device memory 114, and then used or otherwise implemented by the one or more processors 112. In some implementations, the client computing system 102 can implement multiple parallel instances of a single machine-learned model 120 (e.g., to perform parallel retrieval and composition of modular application spaces across multiple instances of user data obtained via a user interface associated with a user device.

More particularly, the machine learned model can obtain data indicative of user input (e.g., user session data 124A). The user input data can be associated with a current user session and/or include historical user data. For example, data associated with a current user session can be data obtained in real-time via a user input component 122. Historical user data can include data associated with a user account, user characteristics, etc. Historical user data can include data associated with a user device (e.g., device identifier). In addition, or alternatively, historical user data can include data associated with a user identifier. In some embodiments, historical user data can include aggregated data associated with a plurality of user identifiers. In some embodiments, the training data 162 can include session data (e.g., of one or more input sessions) associated with one or more input devices, such as session data indexed over a type of input interface or device (e.g., mobile device with touchscreen, mobile device with keyboard, large touchscreen, small touchscreen, large touchscreen, voice inputs, or combinations thereof, etc.). In some embodiments, the training data 162 can include session data not associated with user identifiers. Using the machine-learned model, the system can query the suggested content items index 140 to determine one or more relevant content items (e.g., content items 142A-E) and/or one or more relevant content item data (e.g., content item data 144A-E, predicted performance increase, predicted performance metrics, content item characteristics) as output from the machine-learned model. The system can retrieve, suggest, and/or generate one or more content items in response to obtaining a user input.

Additionally, or alternatively, one or more machine-learned models 126 can be included in or otherwise stored and implemented by the server computing system 104 that communicates with the client computing system 102 according to a client-server relationship. For example, the machine-learned models 126 can be implemented by the server computing system 104 as a portion of a web service (e.g., a content development service, a campaign management service, a content strategy management service). Thus, one or more machine-learned models 120 can be stored and implemented at the client computing system 102 and/or one or more models 126 can be stored and implemented at the server computing system 104.

The client computing system 102 can also include one or more user input components 122 that can receive user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The client computing system can include a user data database 124. User data database 124 can include user session data 124A, user context data 124B, and/or user account data 124C. User session data 124A can include data obtained via user input component 122 indicative of a current user session. For example, user session data 124A can include a current search term and/or other user input received within a threshold time of the current session. For example, a user can submit a first search and five minutes later submit a second search. The proximity of the first search and second search in time can be user context data 124B. The system can use user context data 124B when processing the user query to determine relevant content items and predicted performance increases (e.g., predicted performance metrics) to provide in response to the data indicative of user input to the structured user interface. The data indicative of user input can be used by client computing system 102 to send a request to server computing system 104 for one or more suggested content items (e.g., suggested headlines, generated user interface elements, suggested labels). The computing system can cause the one or more suggested content items to be retrieved, generated, and/or presented to a user via a user interface of a device (e.g., user device). User context data 124B can include context of prior sessions and/or historical session data. User context data can include a location, a time, prior campaigns, prior content items used, device used, type of construction workflow used, etc. User account data 124C can include data associated with a user account (e.g., login, device identifier, user identifier).

The server computing system 104 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more computer-readable storage media which may be non-transitory, such as RAM, ROM, EEPROM, EPROM, flash memory devices, magnetic disks, etc., and combinations thereof. The memory 134 can store data 136 and instructions 138 which are executed by the processor 132 to cause the server computing system 104 to perform operations.

In some implementations, the server computing system 104 includes or is otherwise implemented by one or more server computing devices. In instances in which the server computing system 104 includes plural server computing devices, such server computing devices can operate according to sequential computing architectures, parallel computing architectures, or some combination thereof.

The server computing system 104 can include suggested content items index 140. The suggested content items index 140 can include a plurality of content items 142A-E and associated content item data 144A-E. Suggested content items index 140 can be organized in a manner based on content item data 144A-E associated with the content items 142A-E. The server computing system can parse the suggested content items index 140 to determine which component of content items 142A-E are most responsive to a user input (e.g., user query, user request, etc.).

As described above, the server computing system 104 can store or otherwise include one or more machine-learned models 126. For example, the machine-learned models 126 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example machine-learned models 126 are discussed with reference to FIG. 2.

The client computing system 102 and/or the server computing system 104 can train the machine-learned models 120 and/or 126 via interaction with the training computing system 106 that is communicatively coupled over the network 108. The training computing system 106 can be separate from the server computing system 104 or can be a portion of the server computing system 104.

The training computing system 106 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more computer-readable storage media which may be non-transitory, such as RAM, ROM, EEPROM, EPROM, flash memory devices, magnetic disks, etc., and combinations thereof. The memory 154 can store data 156 and instructions 158 which are executed by the processor 152 to cause the training computing system 106 to perform operations. In some implementations, the training computing system 106 includes or is otherwise implemented by one or more server computing devices (e.g., the server computing system 104).

The training computing system 106 can include a model trainer 160 that trains the machine-learned models 120 and/or 126 stored at the client computing system 102 and/or the server computing system 104 using various training or learning techniques, such as, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 126 based on a set of training data 162. The training data 162 can include, for example, past performance metrics (e.g., predicted performance increase(s)).

In some implementations, if the user has provided consent, the training examples can be provided by the client computing system 102. Thus, in such implementations, the machine-learned model 120 provided to the client computing system 102 can be trained by the training computing system 106 on user-specific data received from the client computing system 102. In some instances, this process can be referred to as personalizing the model.

The model trainer 160 includes computer logic utilized to provide desired functionality. The model trainer 160 can be implemented in hardware, firmware, and/or software controlling a general-purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 108 can be any type of communications network, such as a local area network (e.g., intranet), wide area network (e.g., Internet), or some combination thereof and can include any number of wired or wireless links. In general, communication over the network 108 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. The semantic intent output may comprise at least one word or phrase determined from the text or natural language data. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In some implementations, the machine-learned models can be deployed on-device. For example, one or more components of a predictive machine-learned model or pipeline can be deployed on-device to avoid the upload of potentially sensitive information relating to the types of input, the types of device(s), or the contents of the inputs (e.g., relating to disabilities, contact information, address, etc.) to a server. For example, the server computing system can send a form with a learned context vector describing one or more input fields associated with a component (e.g., portion of an application associated with performance of a processing task). An onboard client model associated with the client computing system 102 can input local client characteristics (e.g., obtained via the user input component 122) and a context vector to generate a composed modular application. This on device processing can increase data privacy for a user. In some embodiments, this can also reduce the amount of data transmitted off-device, thereby reducing bandwidth usage.

Example Model Arrangements

Figure 2:
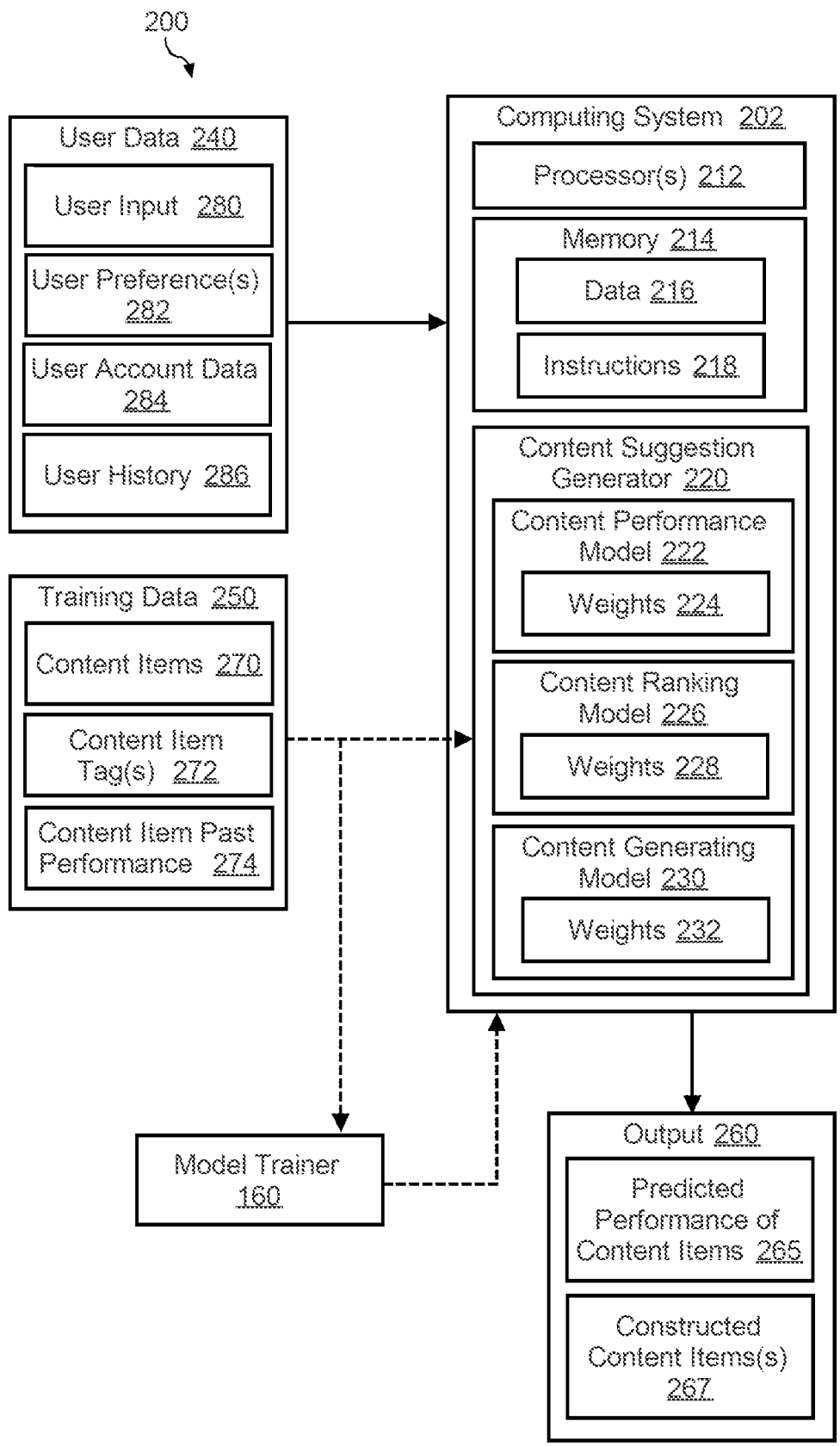
FIG. 2 depicts a block diagram associated with machine-learned model(s) according to example embodiments of the present disclosure.

FIG. 2 depicts one example system 200 for generating predicted performance increases associated with suggested content items and providing an updated user interface including the suggested content items and the respective predicted performance increase according to example embodiments of the present disclosure. The example system 200 contains a computing system 202. The computing system 202 can be any type of system of one or more computing devices (e.g., client computing system 102, server computing system 104, etc.). A computing device can be, for example, a personal computing device (e.g., laptop or desktop), a mobile computing device (e.g., smartphone or tablet), a gaming console or controller, a wearable computing device, an embedded computing device, a server computing device, a node of a distributed computing device, a virtual instance hosted on a shared server, or any other type of computing device. In some embodiments, the computing system 202 includes a plurality of computing devices interconnected via a network or otherwise distributed in an interoperable manner. For example, the computing system 202 can include a server for serving content over a network (e.g., network 108). For instance, the computing system 202 can include a web server for hosting web content, for collecting data regarding web content (e.g., for receiving, monitoring, generating, or otherwise processing data regarding web content, such as the use, download of, and/or interaction with web content).

The computing system 202 can contain processor(s) 212 and memory 214. The one or more processors 212 can be any suitable processing device (e.g., a processor core, a microprocessor, an ASIC, an FPGA, a controller, a microcontroller, etc.) and can be one processor or a plurality of processors that are operatively connected. The memory 214 can include one or more computer-readable storage media which may be non-transitory, such as RAM, ROM, EEPROM, EPROM, flash memory devices, magnetic disks, etc., and combinations thereof. The memory 214 can store data 216 and instructions 218 which are executed by the processor 212 to cause the computing system 202 to perform operations.

In some implementations, the computing system 202 can store or otherwise implement one or more machine-learned models of a machine-learned model framework. In some embodiments, the content suggestion generator 220 comprises a three-model machine-learned model framework. In some embodiments the composer subsystem comprises no machine-learned model framework and/or any combination of content performance model 222, content ranking model 226, and content generating model 230. The machine-learned model framework can include a machine-learned content performance model 222 (e.g., with learnable weights 224), a machine-learned content ranking model 226 (e.g., with learnable weights 228), and/or a machine-learned content generating model 230 (e.g., with learnable weights 232). In some embodiments, the content suggestion generator 220 can implement a single model that implements content suggestion, content performance, content ranking, content generating, and/or any combination (e.g., by combining one or more aspects of the content performance model 222, content ranking model 226, and/or content generating model 230, by training a single model to obtain the desired outputs directly, etc.). One or more of the machine-learned models can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

Embodiments of the example system 200 may be configured, as shown in FIG. 2, to process a user data 240. Responsive to processing the user data 240, the computing system 202 can provide output 260. Output 260 can include predicted performance of content items 265 and/or generated constructed content items 267. Based on the predicted performance of content items 265 and the generated constructed content items 267, the system can rank the content items. The system can provide for display the ranked content items. The machine learned models can be trained using training data 250. This data can include, for example, content items 270, content item tag(s) 272, content item past performance 274, etc.

In some embodiments, the user data 240 is entered into an input interface of the computing system 202. For example, in some embodiments, the content suggestion generator 220 can be configured to process user data 240 as input to the computing system 202. In some embodiments, the user data 240 can be implicit in the structure and/or configuration of content suggestion generator 220. For example, the content suggestion generator 220 can be configured to generate predicted performance of content items 265 and generated constructed content items 267 in response to user input and contextual data based on user data and prior user sessions.

In some implementations, the content suggestion generator model is trained to receive a set of input data (e.g., data indicative of user data 240) descriptive of user input and, in response, provide output data (e.g., predicted performance increase of content items 265 and generated constructed content items 267) indicative of one or more predicted performance of content items and/or generated combined content items (e.g., comprising a suggestion alongside a predicted performance metric/predicted performance increase) to be rendered via a user interface. For instance, FIG. 2 illustrates the machine-learned model performing inference along the solid lines, with an example training flow illustrated along the dashed lines.

In some implementations, the input data can include one or more features that are associated with an instance or an example. In some implementations, the one or more features associated with the instance or example can be organized into a feature vector. In some implementations the output data can include one or more predictions. Predictions can also be referred to as inferences. Thus, given features associated with a particular instance, the machine-learned model can output a prediction for such instance based on the features.

The machine-learned model can be or include one or more of various different types of machine-learned models. In particular, in some implementations, the machine-learned model can perform classification, regression, clustering, anomaly detection, recommendation generation, and/or other tasks.

In some implementations, the user data 240 includes user input 280 (e.g., indicative of a current user session), user preferences 282, user account data 284, and/or user history 286. In some embodiments, user data 240 can include instances of substantially any kind or type of data that may be descriptive of various phenomena. In general, an instance refers to a set of one or more data values grouped together to describe a particular subject or subject matter. For example, an instance can be a feature vector. An instance can be associated with image data (e.g., a feature vector for an image, a hashed image, etc.). An instance can be associated with a measurement or other data collection event (e.g., at a particular time, or of a particular subject, or using a particular device, or from a particular perspective, etc.). An instance can be associated with a network session, such as a set of interactions with a web server. In some embodiments, an instance can be associated with a user's interaction with web content (e.g., anonymous or identified).

In some embodiments, the content suggestion generator 220 can be trained using reinforcement learning. For example, a training dataset comprising historical user input, and user-generated spaces can be used to train composer component subsystems. In response to obtaining user data, the system can determine a predicted performance of one or more content items, rank the one or more content items, and/or generate one or more combined content items. The system can learn appropriate weights based on receiving a reward for predicted performance of content items that are that align with a measured content item performance. Measured content item performance can include a content item past performance, a subsequent performance of a content item, etc. In some implementations, the content suggestion generator 220 can be a machine-learned model. The training data 250 and user interaction data can be used by a model trainer 160 to train the content suggestion generator 220.

The trained model can be used to predict performance of one or more content items which can in turn be used to rank one or more candidate content items, generate one or more combined content items, and/or update a structured user interface and/or construction workflow. In some embodiments, a simulated user model can be trained using the training data to generate simulated inputs according to patterns learned from the training data. The simulated user model can, in some instances, provide a simulated environment in which the reinforcement learning agent, the notification element subsystem, can be trained.

Example Methods

Figure 3:
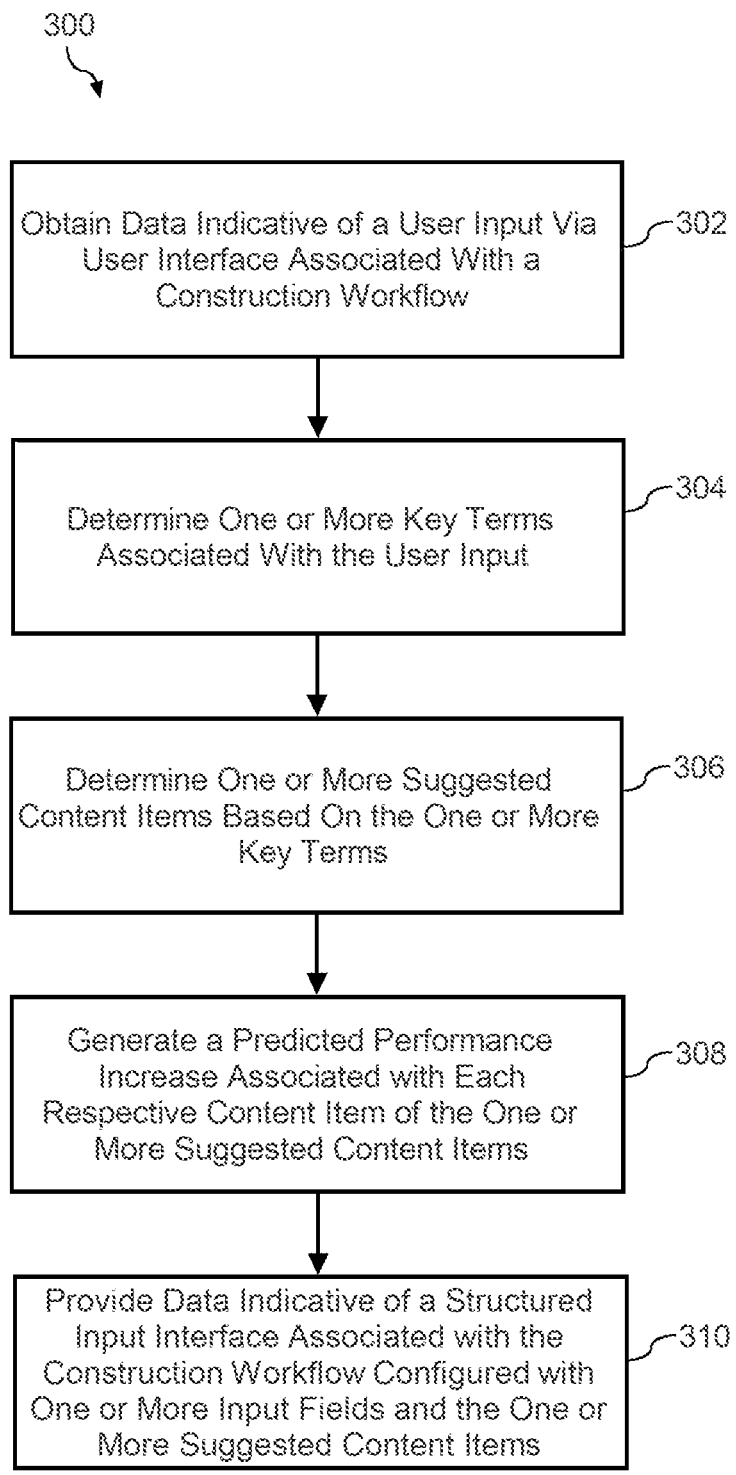
FIG. 3 depicts a flowchart of an example method according to example embodiments of the present disclosure.

FIG. 3 depicts a flow chart diagram of an example method 300 to perform according to example embodiments of the present disclosure. Although FIG. 3 depicts steps performed in a particular order for purposes of illustration and discussion, the methods of the present disclosure are not limited to the particularly illustrated order or arrangement. The various steps of method 300 can be omitted, rearranged, combined, and/or adapted in various ways without deviating from the scope of the present disclosure.

At (302), method 300 can include obtaining data indicative of user input via a user interface associated with a construction workflow. For instance, a computing system can obtain data indicative of user input via a user interface associated with a construction workflow: A construction workflow can be associated with a third party that provides a platform for content creators to generate customized content items (e.g., search results for display that link to a website, an advertisement, generated constructed content items 267).

By way of example, user input can include a uniform resource locator (URL). For example, the URL can be associated with a website associated with a user (e.g., content provider) that is generating a customized content item (e.g., advertisement, interactive user interface elements, etc.) via the construction workflow. User input can include an identifier and/or characteristic associated with the construction workflow. For example, a user can generate an interactive user interface via the construction workflow display on another computing device. The interactive user interface can be associated with an application, web service, etc. The system can obtain data about the subject matter of the user input and/or any other identifying characteristics which can be used by the system to provide predicted performance, suggested content items, and/or generated combined content items.

As described herein, user input can include user data. By way of example the user data can include at least one of (i) input data indicative of a user input into at least one of a plurality of input fields associated with the construction workflow, (ii) user account data, or (iii) device identifier data. For example, user account data can be indicative of at least one of (i) an account age, (ii) a content strategy type, (iii) a user size, or (iv) one or more content strategy performance metrics associated with one or more prior content strategies. For example, a user can be a company and/or organization. A user size can be indicative of a company size (e.g., number of employees, size relative to the market, annual revenue). Content Strategy performance metrics can be indicative of the success of a prior content strategy. Success of prior content strategy can be defined by a conversion rate, number of sign-ups for a service, number of purchases, number of downloads, number of clicks, etc.

At (304), method 300 can include determining one or more key terms (e.g., keywords) associated with the user input. For instance, a computing system can determine one or more key terms associated with the user input. By way of example, determining one or more key terms associated with the user input can include at least one of (i) analyzing the uniform resource locator (URL) for key terms or (ii) analyzing a website associated with the uniform resource locator (URL) for key terms. For example, the system can parse the string of characters of the URL to determine if there are any descriptive words within the string of characters. Additionally, or alternatively, a website associated with the URL can be analyzed (e.g., via image processing, natural language processing, and/or any other reasonable means) to extract and/or generate one or more key terms.

At (306), method 300 can include determining one or more suggested content items based on the one or more key terms. For instance, a computing system can determine one or more suggested content items based on the one or more key terms. For example, the suggested content items can include a headline, an image, a video, a phrase, a singular word, etc. By way of example, the user input can include a URL for a website that facilitates adoptions of dogs. The URL can be "www.Fureverfriendpetfinder.com." The system can determine that key terms associated with the URL include "fur," "friend," "pet" and/or "find." The system can determine one or more suggested content items (e.g., headlines to use in an advertisement, image, video, phrase, words) based on the keyword(s).

In some implementations, the one or more suggested content items can include a suggested phrase generated using a machine-learned model. For example, the machine-learned model can be trained on historical data indicative of past performance of content items, user sessions, input completion rates, and error rates. The machine-learned model can obtain data indicative of a current user session. Based on the obtained user session data, the model can generate a suggested phrase (e.g., combined content item).

The system can provide the suggested phrase to be displayed via the user interface as a suggested content item.

In some implementations the suggested content item(s) can include a suggested phrase (e.g., combined content item) obtained from a data repository. The data repository can include a plurality of suggested phrases. For example, the plurality of suggested phrases can be predetermined phrases that relate to the one or more key terms. In response to obtaining data associated with a user session, the system can select a suggested phrase from the data repository. The system can provide the suggested phrase to be displayed via the user interface as the suggested content item.

At (308), method 300 can include generating a predicted performance increase associated with each respective content item of the one more suggested content items. For instance, a computing system can generate a predicted performance increase associated with each respective content item of the one more suggested content items. As described herein, generating the predicted performance increase associated with each respective suggested content item of the one or more suggested content items can include generating a predicted performance increase for at least one of (i) an individual word of the respective suggested content item or (ii) a phrase of the respective suggested content item. In some implementations, the predicted performance increase can be displayed as at least one of (i) an average predicted performance increase (ii) a range of predicted performance increase, or (iii) a statistical significance of a predicted performance increase. The system can generate a predicted performance increase in a numerical form. For example, the predicted performance increase can be a percentage.

In some implementations, the predicted performance increase is generated using a model. For example, the model can be a machine-learned model. In some implementations, past performance of a content item can be input into the model and used to generate the predicted performance increase of each respective content item of the one or more suggested content items. In some embodiments, the system can train the model. For example, the model can be trained using actual performance data.

In some embodiments, the system can generate a predicted performance increase. For example, the system can obtain data indicative of past performance of one or more content items with one or more respective features. The system can compare one or more features of a first suggested content item to one or more features of a prior used content item. By way of example, the features of a prior used content item can include words, meanings of words, synonyms of words, visual characteristics, etc. The system can determine, based on the comparison of the one or more features of the first suggested content item and the prior used content item and the past performance of the one or more content items, a predicted performance for the first suggested content item. The first suggested content item of the one or more suggested content items can include at least one of (i) a word, (ii) a phrase, (iii) an image, (iv) a video, or (v) an audio content item.

The system can determine a predicted performance increase for each respective suggested content item. The system can determine a predicted performance increase for each respective suggested content item before the items are selected for display. The system can determine a predicted performance increase for each respective suggested content item after the items are displayed via a user interface.

By way of example, the system can determine a predicted performance increase for a respective suggested content item. The system can obtain a suggested content item. The suggested content item can include a plurality of words. For example, the suggested content item can be "Store A Home Furniture." The system can determine a predicted performance increase for each individual word. For example, the system can determine a predicted performance increase for "Store A," a predicted performance increase for "Home," and a predicted performance increase for "Furniture." In some embodiments, the system can determine a predicted performance increase for a plurality of combinations of the words. For example, the system can determine a predicted performance increase for "Store A" and a predicted performance increase for "Home Furniture."

In some implementations, the system can determine an aggregate predicted performance increase (e.g., predicted performance metric) based on a combination of the individual predicted performance increases. The system can combine the predicted performance increase for "Store A," "Home," and "Furniture" to generate a combined predicted performance increase. Additionally, or alternatively, the system can combine the predicted performance increase for "Store A" and the predicted performance increase for "Home Furniture" to generate a combined predicted performance increase. In some embodiments, the system can combine the plurality of generated combined predicted performance increases to create an aggregate predicted performance increase.

In some implementations, the system can provide for display the predicted performance increase for each individual word. For example, the system can generate a visual representation of the predicted performance increase for each individual word of the suggested content item. The visual representation can be rendered on a user interface (e.g., graphical user interface) of a user device. The visual representation can comprise a selectable component rendered on the user interface. The visual representation can include a different colored text, bolded text, and/or any other visual characteristic that draws attention to the predicted performance increase being displayed.

In some implementations, the system can provide for display the aggregate predicted performance increase for the combined suggested content item. For example, the system can generate a visual representation of the aggregate predicted performance increase. The visual representation can be rendered on a user interface (e.g., graphical user interface) of a user device. The visual representation can comprise a selectable component rendered on the user interface. The predicted performance increase can be represented as an average. The predicted performance increase can be represented as a range (see, e.g., FIGS. 7A-7B and 8A-8B).

At (310), method 300 can include providing data indicative of a structured input interface associated with the construction workflow configured with one or more input fields and the one or more suggested content items. For instance, a computing system can provide data indicative of a structured input interface associated with the construction workflow configured with one or more input fields and the one or more suggested content items. As described herein, the system can provide, to a first user device, data indicative of a structured input interface (e.g., structured user interface, user interface, etc.) associated with the construction workflow configured with one or more input fields and the one or more suggested content items. The structured input interface is configured for rendering via a graphical user interface. For example, the structured input interface can be rendered for display on a user device. The system can allow for more efficient allocation of computing resources by reconfiguring a structured input interface to increase optimization of available screen space. For example, in some embodiments, constructed content items can be automatically generated using machine-learned models to optimize predicted performance increase for a constructed content item based on predicted performance increase for individual suggested content items. This can help reduce user errors and help reduce the computational processing and bandwidth usage by decreasing transmission of error notifications, transmission of incomplete input data structures, and futile processing of incomplete inputs.

In some embodiments, providing data indicative of the structured input interface associated with the construction workflow configured with one or more input fields and the one or more suggested content items can include ranking the one or more suggested content items based at least in part on respective predicted performance. For example, a suggested content item with a predicted performance increase of 4.67% can be ranked higher than a content item with a predicted performance increase of 2%. The system can reduce unnecessary processing by pre-filtering suggested content items, and only calculating predicted performance increase for suggested content items if the system has obtained information indicative of express user interest in selecting a particular content item. Thus, the system can reduce generation of predicted performance increase for items that will never be surfaced to the user due to lack of interest.

By way of example, ranking the one or more suggested content items can include determining a threshold performance increase value. The system can compare each respective predicted performance increase to the threshold performance increase value. The system can determine that a first predicted performance increase associated with a first suggested content item is above the threshold performance increase value. The system can determine that a second predicted performance increase associated with a second suggested content item is above the threshold performance increase value and below the first predicted performance increase. The system can provide for display the first suggested content item and the second suggested content item. The first suggested content item can be displayed in a more prominent position than the second suggested content item. For example, the system can send instructions to the first user device which cause the user device to display (e.g., render) the first suggested content item and the second suggested content item. By way of example, the first suggested content item could be displayed in a list before the second suggested content item. Additionally, or alternatively, the first suggested content item could be distinguished using visual characteristics (e.g., color, font size, bold, italics).

The method can include generating a first predicted performance increase associated with a first suggested content item. The method can include comparing the first predicted performance increase with a threshold performance increase value. The method can include determining that the first predicted performance increase is below the threshold performance increase value. The method can include in response to determining that the first predicted performance increase is below the threshold performance increase value, preventing display of the first suggested content item. For example, a threshold performance increase value could be 2%. If a first predicted performance increase associated with the first suggested content item is 1.5%, then the method can include preventing the display of the first suggested content item. This can be used as a pre-filter to more efficiently utilize space of a structured user interface by only displaying suggested content items with a predicted performance increase above a desired threshold.

Figure 6:
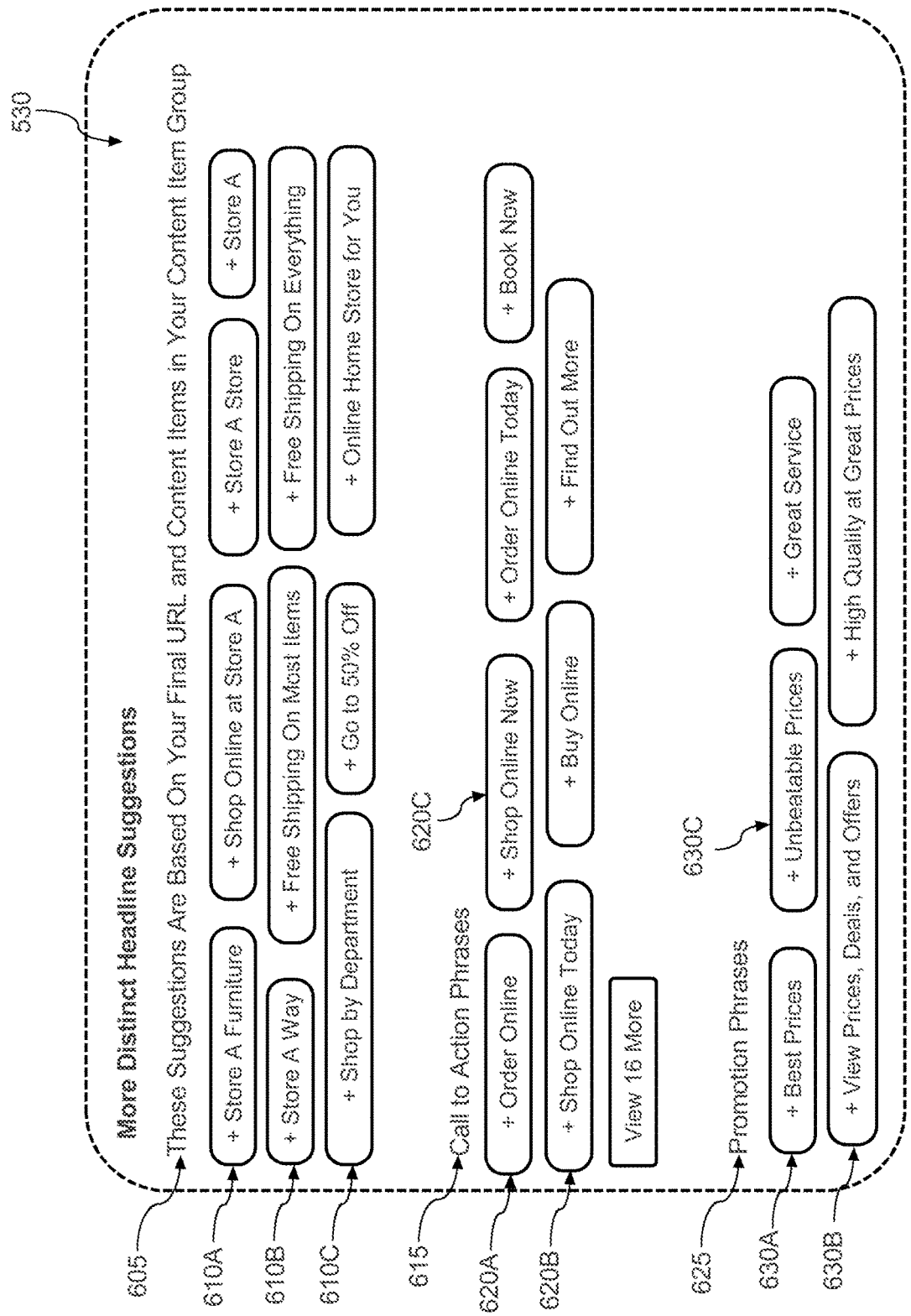
FIG. 6 depicts example user interfaces according to example embodiments of the present disclosure.

The method can include obtaining data of a user indicating interest in a content item. In response to obtaining the data indicative of the user indicating interest in a first content item of the suggested content items, generating a predicted performance for the first content item. For example, data of a user indicating interest in a content item can include data indicative of a user clicking, hovering, or otherwise interacting with a content item displayed on a screen. In some examples, data indicative of a user indicating interest in a content item can include audio, touch, and/or gesture data. For example, as depicted in FIG. 6, the system can cause a plurality of suggested content items to be displayed. The system can obtain data indicative of user interest in a suggested content item (e.g., content item 610B) and in response to obtaining that data determine the predicted performance for the respective suggested content item. This can prevent preprocessing of predicted performance to decrease on unnecessary processing and bandwidth usage.

The method can include obtaining data indicative of a user selection of a first suggested content item of the one or more suggested content items. The method can include determining a predicted performance of a constructed content item (e.g., customized content items, generated constructed content items 267) based at least in part of the predicted performance of the first suggested content item.

Figure 4:
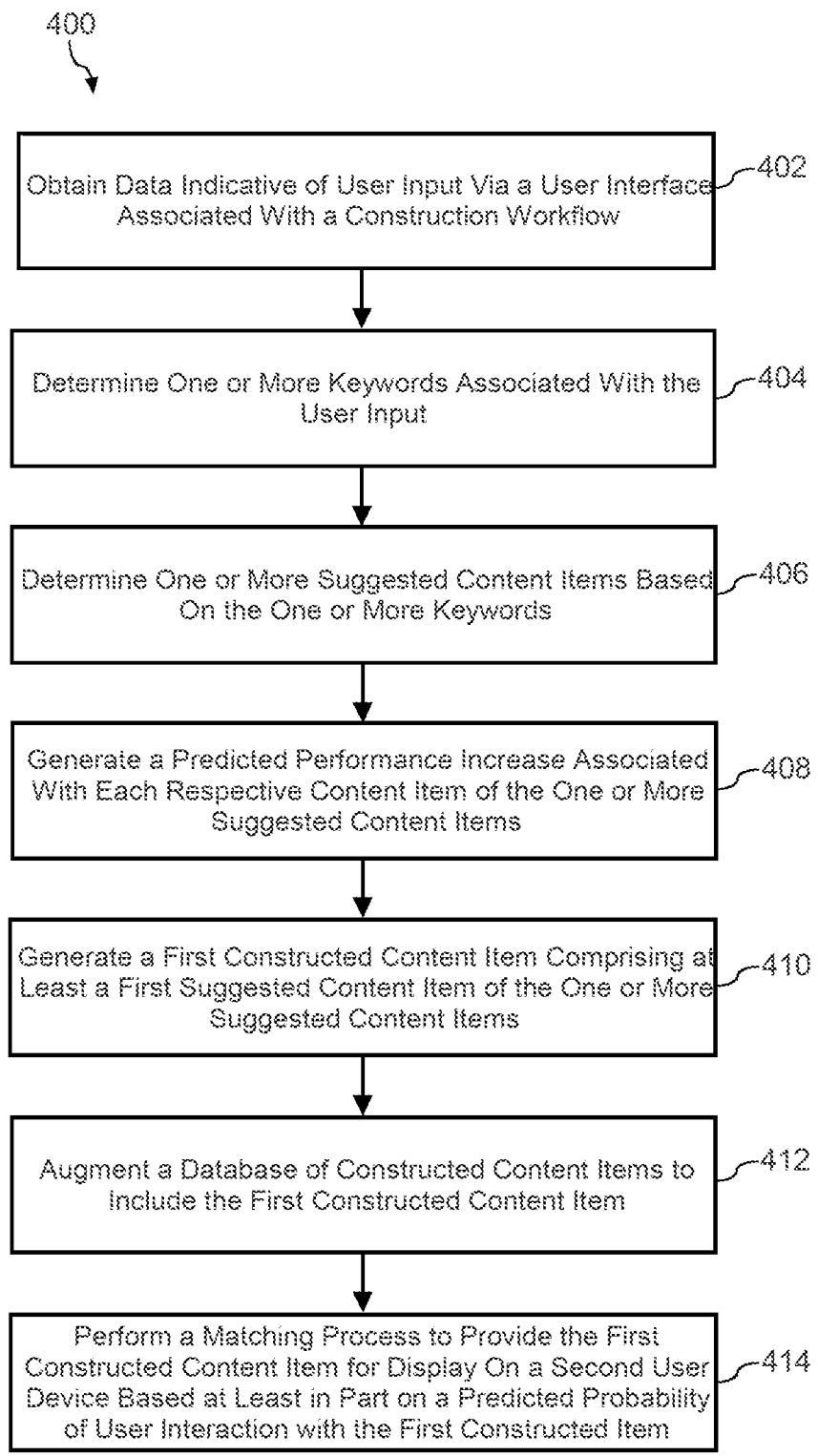
FIG. 4 depicts a flowchart of an example method according to example embodiments of the present disclosure.
Figure 5:
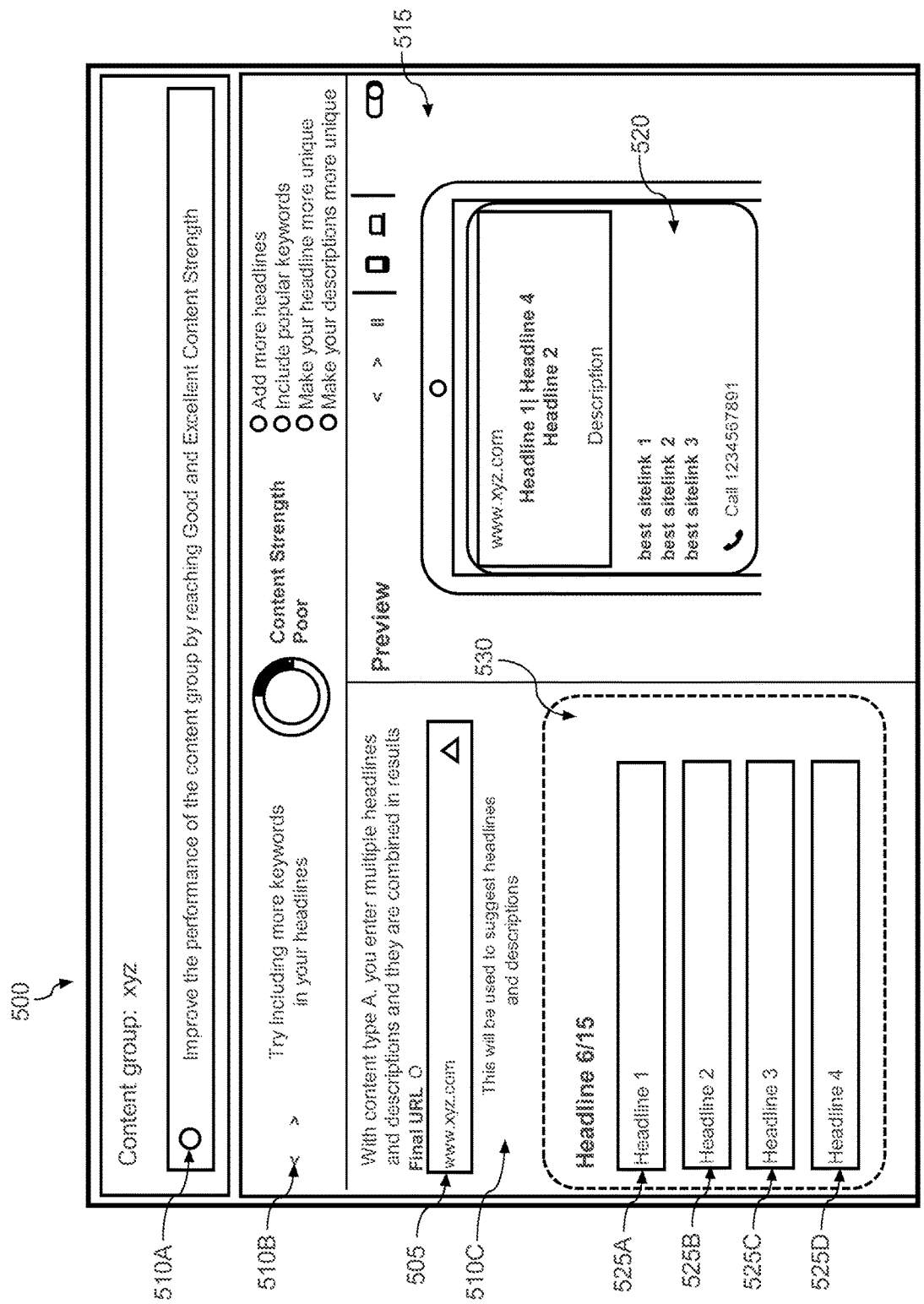
FIG. 5 depicts an example user interface according to example embodiments of the present disclosure.

FIG. 4 depicts a flow chart diagram of an example method 400 to perform according to example embodiments of the present disclosure. Although FIG. 4 depicts steps performed in a particular order for purposes of illustration and discussion, the methods of the present disclosure are not limited to the particularly illustrated order or arrangement. The various steps of method 400 can be omitted, rearranged, combined, and/or adapted in various ways without deviating from the scope of the present disclosure.

At (402), method 400 can include obtaining data indicative of user input via a user interface associated with a construction workflow. For instance, a computing system can obtain data indicative of user input via a user interface associated with a construction workflow: A construction workflow can be associated with a third party that provides a platform for content creators to generate customized content items (e.g., search results for display that link to a website, an advertisement, generated constructed content items 267).

By way of example, user input can include a uniform resource locator (URL). For example, the URL can be associated with a website associated with a user (e.g., content provider) that is generating a customized content item (e.g., advertisement, interactive user interface elements, etc.) via the construction workflow. User input can include an identifier and/or characteristic associated with the construction workflow. For example, a user can generate an interactive user interface via the construction workflow display on another computing device. The interactive user interface can be associated with an application, web service, etc. The system can obtain data about the subject matter of the user input and/or any other identifying characteristics which can be used by the system to provide predicted performance, suggested content items, and/or generated combined content items.

As described herein, user input can include user data. By way of example the user data can include at least one of (i) input data indicative of a user input into at least one of a plurality of input fields associated with the construction workflow; (ii) user account data, or (iii) device identifier data. For example, user account data can be indicative of at least one of (i) an account age, (ii) a content strategy type, (iii) a user size, or (iv) one or more content strategy performance metrics associated with one or more prior content strategies. For example, a user can be a company and/or organization. A user size can be indicative of a company size (e.g., number of employees, size relative to the market, annual revenue). Content Strategy performance metrics can be indicative of the success of a prior content strategy. Success of prior content strategy can be defined by a conversion rate, number of sign-ups for a service, number of purchases, number of downloads, number of clicks, etc.

At (404), method 400 can include determining one or more key terms (e.g., keywords) associated with the user input. For instance, a computing system can determine one or more key terms associated with the user input. By way of example, determining one or more key terms associated with the user input can include at least one of (i) analyzing the uniform resource locator (URL) for key terms or (ii) analyzing a website associated with the uniform resource locator (URL) for key terms. For example, the system can parse the string of characters of the URL to determine if there are any descriptive words within the string of characters. Additionally, or alternatively, a website associated with the URL can be analyzed (e.g., via image processing, natural language processing, and/or any other reasonable means) to extract and/or generate one or more key terms.

At (406), method 400 can include determining one or more suggested content items based on the one or more key terms. For instance, a computing system can determine one or more suggested content items based on the one or more key terms. For example, the suggested content items can include a headline, an image, a video, a phrase, a singular word, etc. By way of example, the user input can include a URL for a website that facilitates adoptions of dogs. The URL can be "www.Fureverfriendpetfinder.com." The system can determine that key terms associated with the URL include "fur," "friend," "pet" and/or "find." The system can determine one or more suggested content items (e.g., headlines to use in an advertisement, image, video, phrase, words) based on the keyword(s).

In some implementations, the one or more suggested content items can include a suggested phrase generated using a machine-learned model. For example, the machine-learned model can be trained on historical data indicative of past performance of content items, user sessions, input completion rates, and error rates. The machine-learned model can obtain data indicative of a current user session. Based on the obtained user session data, the model can generate a suggested phrase (e.g., combined content item). The system can provide the suggested phrase to be displayed via the user interface as a suggested content item.

In some implementations the suggested content item(s) can include a suggested phrase (e.g., combined content item) obtained from a data repository. The data repository can include a plurality of suggested phrases. For example, the plurality of suggested phrases can be predetermined phrases that relate to the one or more key terms. In response to obtaining data associated with a user session, the system can select a suggested phrase from the data repository. The system can provide the suggested phrase to be displayed via the user interface as the suggested content item.

At (408), method 400 can include generating a predicted performance increase associated with each respective content item of the one or more suggested content items. For instance, a computing system can generate a predicted performance increase associated with each respective content item of the one or more suggested content items. As described herein, generating the predicted performance increase associated with each respective suggested content item of the one or more suggested content items can include generating a predicted performance increase for at least one of (i) an individual word of the respective suggested content item or (ii) a phrase of the respective suggested content item. In some implementations, the predicted performance increase can be displayed as at least one of (i) an average predicted performance increase (ii) a range of predicted performance increase, or (iii) a statistical significance of a predicted performance increase. The system can generate a predicted performance increase in a numerical form. For example, the predicted performance increase can be a percentage.

In some implementations, the predicted performance increase is generated using a model. For example, the model can be a machine-learned model. In some implementations, past performance of a content item can be input into the model and used to generate the predicted performance increase of each respective content item of the one or more suggested content items. In some embodiments, the system can train the model. For example, the model can be trained using actual performance data.

In some embodiments, the system can generate a predicted performance increase. For example, the system can obtain data indicative of past performance of one or more content items with one or more respective features. The system can compare one or more features of a first suggested content item to one or more features of a prior used content item. By way of example, the features of a prior used content item can include words, meanings of words, synonyms of words, visual characteristics, etc. The system can determine, based on the comparison of the one or more features of the first suggested content item and the prior used content item and the past performance of the one or more content items, a predicted performance for the first suggested content item. The first suggested content item of the one or more suggested content items can include at least one of (i) a word, (ii) a phrase, (iii) an image, (iv) a video, or (v) an audio content item.

The system can determine a predicted performance increase for each respective suggested content item. The system can determine a predicted performance increase for each respective suggested content item before the items are selected for display. The system can determine a predicted performance increase for each respective suggested content item after the items are displayed via a user interface.

By way of example, the system can determine a predicted performance increase for a respective suggested content item. The system can obtain a suggested content item. The suggested content item can include a plurality of words. For example, the suggested content item can be "Store A Home Furniture." The system can determine a predicted performance increase for each individual word. For example, the system can determine a predicted performance increase for "Store A," a predicted performance increase for "Home," and a predicted performance increase for "Furniture." In some embodiments, the system can determine a predicted performance increase for a plurality of combinations of the words. For example, the system can determine a predicted performance increase for "Store A" and a predicted performance increase for "Home Furniture."

In some implementations, the system can determine an aggregate predicted performance increase (e.g., predicted performance metric) based on a combination of the individual predicted performance increases. The system can combine the predicted performance increase for "Store A," "Home," and "Furniture" to generate a combined predicted performance increase. Additionally, or alternatively, the system can combine the predicted performance increase for "Store A" and the predicted performance increase for "Home Furniture" to generate a combined predicted performance increase. In some embodiments, the system can combine the plurality of generated combined predicted performance increases to create an aggregate predicted performance increase.

In some implementations, the system can provide for display the predicted performance increase for each individual word. For example, the system can generate a visual representation of the predicted performance increase for each individual word of the suggested content item. The visual representation can be rendered on a user interface (e.g., graphical user interface) of a user device. The visual representation can comprise a selectable component rendered on the user interface. The visual representation can include a different colored text, bolded text, and/or any other visual characteristic that draws attention to the predicted performance increase being displayed.

In some implementations, the system can provide for display the aggregate predicted performance increase for the combined suggested content item. For example, the system can generate a visual representation of the aggregate predicted performance increase. The visual representation can be rendered on a user interface (e.g., graphical user interface) of a user device. The visual representation can comprise a selectable component rendered on the user interface. The predicted performance increase can be represented as an average. The predicted performance increase can be represented as a range (see, e.g., FIGS. 7A-7B and 8A-8B).

At (410), method 400 can include generating, automatically, a first constructed content item comprising at least a first suggested content item of the one or more suggested content items. The method can include generating the first constructed content item based at least in part on comparing a first predicted performance increase associated with the first suggested content item to a threshold predicted performance increase value. The threshold predicted performance increase value can be determined based on user input data. The method can include generating the first constructed content item based at least in part on determining the first predicted performance increase is above the threshold predicted performance increase value. For instance, a computing system can generate, automatically, a first constructed content item comprising at least a first suggested content item of the one or more suggested content items. The system can generate the first constructed content item based at least in part on comparing a first predicted performance increase associated with the first suggested content item to a threshold predicted performance increase value. The threshold predicted performance increase value can be determined based on user input data. The system can generate the first constructed content item based at least in part on determining the first predicted performance increase is above the threshold predicted performance increase value.

The system can allow for more efficient allocation of computing resources by reconfiguring a structured input interface to increase optimization of available screen space. In some embodiments, constructed content items can be automatically generated using machine-learned models to optimize predicted performance increase for a constructed content item based on predicted performance increase for individual suggested content items. This can help reduce user errors and help reduce the computational processing and bandwidth usage by decreasing transmission of error notifications, transmission of incomplete input data structures, and futile processing of incomplete inputs. Example embodiments can also lead to additional computing efficiencies by automatically providing input elements for triggering automated process flows in subsequent processing steps. Providing improved access to such automated process flows using inputs on the user interface can result in a more efficient utilization of processing resources. Example embodiments can also reduce unnecessary processing by pre-filtering suggested content items, and only calculating predicted performance increase for suggested content items if the system has obtained information indicative of express user interest in selecting a particular content item. Thus, the system can reduce generation of predicted performance increase for items that will never be surfaced to the user due to lack of interest.

By way of example, the first constructed content item can be a customized content item (e.g., advertisement, interactive user interface element). The first constructed content item can be automatically generated by the system using a first suggested content item. The first suggested content item can include a headline, phrase, image, video, etc. The system can determine a suggested content item to use in the constructed content item based on comparing the predicted performance of a first suggested content item to the predicted performance increase associated with a second suggested content item. For example, a content item with a predicted performance increase of 4.67% can be chosen over a content item with a predicted performance increase of 2%.

At (412), method 400 can include augmenting a database of constructed content items to include the first constructed content item. For instance, a computing system can augment a database of constructed content items to include the first constructed content item. By way of example, the system can maintain a database of constructed content items (e.g., advertisements, interactive user interface elements). The system can add newly generated constructed content items to the database. The database can be parsed in response to the system obtaining a request for a constructed content item to be displayed to a third-party user (e.g., consumer).

At (414), method 400 can include performing a matching process to provide the first constructed content item for display on a second user device based at least in part on a predicted probability of user interaction with the first constructed content item. For instance, a computing system can perform a matching process to provide the first constructed content item for display on a second user device based at least in part on a predicted probability of user interaction with the first constructed content item. By way of example, the matching process can include a bidding process. The bidding process can be an automated bidding process comprising a plurality of content providers bidding for content item slots on a second user device. In some embodiments, the second user device can be associated with a third-party user that is unrelated to the content creator, publishers, and/or content creation platform. For example, the second user device can be associated with a consumer.

In some implementations, the system can obtain data indicative of the user interaction with the constructed content item via a user interface on the second user device. The system can use this data to determine actual performance increase associated with the constructed content item and/or suggested content item. The system can use the actual performance increase as training data for a machine-learned model (e.g., model 120 and/or 136) for determining predicted performance increase for one or more suggested content items.

Example User Interfaces

FIGS. 5-8 depict example structured user interfaces according to example embodiments of the present disclosure. In some embodiments, the user interface 500 can include an input field 505. For example, the input field can be associated with a uniform resource locator (URL). User interface 500 can include a plurality of descriptive explanatory fields 510A-C. The descriptive explanatory fields can provide guidance on how user input is used, an estimated strength of a content item based on data obtained by the system during a current user session, etc. Descriptive explanatory field 510A can include a message indicating that the performance of a content item can be increased by increasing a "content strength" metric. Descriptive explanatory field 510B can include specific suggestions on how to improve the content strength. For example, suggestions can include adding more headlines, including popular words, increasing the uniqueness of headlines, and/or increasing uniqueness of descriptions. Descriptive explanatory field 510C can explain what the user input (e.g., into input field 505), will be used for (e.g., to suggest headlines and descriptions).

In some implementations, the user interface can include a preview window 515. The preview window 515 can contain a preview of a content item 520. User interface 500 can include a plurality of input fields 525A-D. In some embodiments, input fields 525A-D can be associated with headline inputs.

The system can obtain data indicative of user interaction with an input field. For example, the input field can be input field 505. For example, the system can obtain data indicative of a user input via a user interface associated with a construction workflow. In some implementations, the construction workflow can be associated with generation of an advertisement and/or some other content item generated by a user for display to a third party.

In some implementations the input field can be input field 525A. In response to obtaining data indicative of user interaction with input field 525A, the system can determine one or more suggested content items to surface (e.g., as described in FIG. 5). Upon obtaining data indicative of user interaction with an input field (e.g., input field 505, 525A-D), one or more suggestions can populate a portion 530 of the user interface 500 with one or more suggested content items. In some embodiments, the portion 530 of user interface 500 can be populated with a predicted performance increase alongside the suggested content items.

The system can populate portion 530 of user interface 500 with a plurality of suggested content items. Turning to FIG. 6, the plurality of suggested content items can include suggested content items 610A-C, 620A-C, 630A-C. The suggested content items can be generated by the system. For example, the suggestions can be generated by pulling data from a URL to determine a store name, or other merchant identifying information. For example, the system can determine a brand name. The system can determine a plurality of suggested content items. The suggested content items can comprise a plurality of words. The system can determine a predicted performance measurement for each respective suggested content item.

The system can transmit data which can cause the display of the suggested content items on a user device (e.g., via the structured user interface). In some implementations, the system can display the suggested content items in an order based on the predicted performance increase. The predicted performance increase can be numerical. The predicted performance increase can be a positive and/or negative value.

Portion 530 of user interface 500 can display distinct headline suggestions. For example, suggestions can be broken into different types. The different types can include a personalized suggestion type 605, a call to action phrase type 615, and/or a promotion phrase type 625. In some embodiments, the distinct headline suggestions can include personalized suggestions based on final URL and other ads in your ad group. Some example personalized suggestions type 605 phrases can include "Store A Furniture" 610A, "Store A Way" 610B, and "Shop by Department" 610C. In some embodiments, the distinct headline suggestions can include call to action phrases. Some examples of call to action phrase type 605 can include "Order Online" 620A, "Shop Online Today" 620B, and "Shop Online Now" 620C. In some embodiments, the distinct headline suggestions can include promotion phrases. Some example promotion phrases type 625 can include "Best Prices" 630A, "View Prices, Deals, And Offers" 630B, and "Unbeatable Prices" 630C. The system can generate and/or retrieve these suggestions in response to obtaining user input.

FIGS. 7A-7B and 8A-8B depict example user interface elements according to example embodiments of the present disclosure. As depicted in FIG. 7A and FIG. 7B, the predicted performance can be a range. FIG. 7A depicts a suggested content item 705 (e.g., phrase of words), a predicted performance increase 710, and a mouse 715. In some implementations, the system can obtain user input indicative of a user showing interest in a particular content item. For example, the user can hover mouse 715 over predicted performance increase 710. In response to obtaining data indicative of user interest in suggested content item 705, the system can present more information on the predicted performance increase 710. As depicted in FIG. 7B, the system can provide for display a user interface element 720) that can display an explanatory phrase describing the predicted performance increase. The explanatory phrase can be provided for display in response to user input.

As depicted in FIG. 8A and FIG. 8B, the predicted performance can be a mean (e.g., average). FIG. 8A depicts a suggested content item 805 (e.g., phrase of words), a predicted performance increase 810, and a mouse 815. In some implementations, the system can obtain user input indicative of a user showing interest in a particular content item. For example, the user can hover mouse 815 over predicted performance increase 810. In response to obtaining data indicative of user interest in suggested content item 805, the system can present more information on the predicted performance increase 810. As depicted in FIG. 8B, the system can provide for display a user interface element 820 that can display an explanatory phrase describing the predicted performance increase. Sometimes the explanatory phrase is shown in response to user input.

In some implementations, the range and/or mean can be determined in response to a user input e.g., hovering over the option can cause the user interface to be updated to provide for display the predicted performance and/or the explanatory message explaining the expected increase. For example, the system can obtain data indicative of user interest in a suggested content item. In response to obtaining the data indicative of the user interest in the suggested content item, the system can determine a predicted performance increase. Thus, utilizing computing resources to determine a predicted performance metric only for suggested content items the user has expressed interest in. This can save computing resources by preventing the system from performing unnecessary calculations.

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The depicted and/or described steps are merely illustrative and can be omitted, combined, and/or performed in an order other than that depicted and/or described: the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure covers such alterations, variations, and/or equivalents.

What is claimed is:

1. A computer implemented method comprising:
   obtaining data indicative of user input via a user interface associated with a construction workflow;
   determining one or more keywords associated with the user input;
   determining one or more suggested content items based on the one or more keywords;
   generating a predicted performance increase associated with each respective content item of the one or more suggested content items;
   ranking the one or more suggested content items based at least in part on the predicted performance increase;
   generating, automatically, a first constructed content item comprising at least a first suggested content item of the one or more suggested content items based at least in part on:
     comparing a first predicted performance increase associated with the first suggested content item to a threshold predicted performance increase value, wherein the threshold predicted performance increase value is determined based on user input data; and
     determining the first predicted performance increase is above the threshold predicted performance increase value;
   augmenting a database of constructed content items to include the first constructed content item; and
   performing a matching process to provide the first constructed content item for display on a second user device based at least in part on a predicted probability of user interaction with the first constructed content item.

2. The method of claim 1, wherein the user input comprises a uniform resource locator (URL).

3. The method of claim 2, wherein determining the one or more keywords associated with the user input comprises at least one of (i) analyzing the uniform resource locator (URL) for keywords or (ii) analyzing a website associated with the uniform resource locator (URL) for keywords.

4. The method of claim 1, wherein generating the predicted performance increase associated with each respective suggested content item of the one or more suggested content item comprises:
generating a predicted performance increase for at least one of (i) an individual word of the respective suggested content item or (ii) a phrase of the respective suggested content item.

5. The method of claim 1, comprising:
obtaining data indicative of a user indicating interest in a content item; and
in response to obtaining the data indicative of the user indicating interest in a first content item of the suggested content items, generating a predicted performance increase for the first content item.

6. The method of claim 1, wherein the predicted performance increase is displayed as at least one of (i) an average predicted performance increase, (ii) a range of predicted performance increase, or (iii) a statistical significance of a predicted performance increase.

7. The method of claim 6, wherein the predicted performance increase is a percentage.

8. The method of claim 1, wherein the predicted performance increase is generated using a model.

9. The method of claim 8, wherein past performance of a content item is input in the model and used to generate the predicted performance increase of each respective content item of the one or more suggested content item.

10. The method of claim 9, comprising:
obtaining data indicative of past performance of one or more content items with one or more respective features;
comparing one or more features of a first suggested content item to one or more features of a prior used content item; and
determining, based on the comparison of the one or more features of the first suggested content item and the prior used content item and the past performance of the one or more content items, a predicted performance increase for the first suggested content item.

11. The method of claim 8, wherein the model is a machine-learned model.

12. The method of claim 11, wherein the model is trained using actual performance data.

13. The method of claim 1, comprising:
obtaining data indicative of a user selection of a first suggested content item of the one or more suggested content items; and
determining a predicted performance increase of a constructed content item based at least in part of the predicted performance increase of the first suggested content item.

14. The method of claim 1, wherein ranking the one or more suggested content items comprises:
determining a threshold predicted performance increase value;
comparing each respective predicted performance increase to the threshold predicted performance increase value;
determining that a second predicted performance increase associated with a second suggested content item is above the threshold predicted performance increase value and below the first predicted performance increase; and
providing for display the first suggested content item and the second suggested content item, wherein the first suggested content item is displayed in a more prominent position than the second suggested content item.

15. The method of claim 1, comprising:
generating a second predicted performance increase associated with a second suggested content item;
comparing the second predicted performance increase with a threshold performance increase value;
determining that the second predicted performance increase is below the threshold predicted performance increase value; and
in response to determining that the second predicted performance increase is below the threshold predicted performance increase value, preventing display of the second suggested content item.

16. The method of claim 1, wherein a first suggested content item of the one or more suggested content items comprises at least one of (i) a word, (ii) a phrase, (iii) an image, (iv) a video, or (v) an audio content item.

17. A system comprising:
one or more processors; and
one or more computer-readable media storing instructions that are executable to cause the one or more processors to perform operations, the operations comprising:
obtaining data indicative of user input via a user interface associated with a construction workflow;
determining one or more keywords associated with the user input;
determining one or more suggested content items based on the one or more keywords;
generating a predicted performance increase associated with each respective content item of the one or more suggested content items;
ranking the one or more suggested content items based at least in part on the predicted performance increase;
generating, automatically, a first constructed content item comprising at least a first suggested content item of the one or more suggested content items based at least in part on:
comparing a first predicted performance increase associated with the first suggested content item to a threshold predicted performance increase value, wherein the threshold predicted performance increase value is determined based on user input data; and
determining the first predicted performance increase is above the threshold predicted performance increase value;
augmenting a database of constructed content items to include the first constructed content item; and
performing a matching process to provide the first constructed content item for display on a second user device based at least in part on a predicted probability of user interaction with the first constructed content item.

18. A non-transitory computer readable medium embodied in a computer-readable storage device and comprising instructions that, when executed by a processor, cause the processor to perform operations, the operations comprising:

obtaining data indicative of user input via a user interface associated with a construction workflow;

determining one or more keywords associated with the user input;

determining one or more suggested content items based on the one or more keywords;

generating a predicted performance increase associated with each respective content item of the one or more suggested content items;

ranking the one or more suggested content items based at least in part on the predicted performance increase;

generating, automatically, a first constructed content item comprising at least a first suggested content item of the one or more suggested content items based at least in part on:

comparing a first predicted performance increase associated with the first suggested content item to a threshold predicted performance increase value, wherein the threshold predicted performance increase value is determined based on user input data; and determining the first predicted performance increase is above the threshold predicted performance increase value;

augmenting a database of constructed content items to include the first constructed content item; and performing a matching process to provide the first constructed content item for display on a second user device based at least in part on a predicted probability of user interaction with the first constructed content item.

19. The non-transitory computer readable medium of claim 18, wherein the predicted performance increase is generated using a model, and wherein past performance of a content item is input in a model and used to generate the predicted performance increase of each respective content item of the one or more suggested content items.

\* \* \* \* \*